United States Patent
Lin et al.

(10) Patent No.: US 10,608,703 B2
(45) Date of Patent: Mar. 31, 2020

(54) METHOD AND ELECTRONIC DEVICE FOR MANAGING POWER SUPPLY DEVICES

(71) Applicant: KWANG YANG MOTOR CO., LTD., Kaohsiung (TW)

(72) Inventors: Chen-Sheng Lin, Kaohsiung (TW); Sen-Hsien Chang, Kaohsiung (TW); Po-Yu Chuang, Taipei (TW); Jen-Chiun Lin, Taipei (TW); Yuh-Rey Chen, Taipei (TW); Te-Chuan Liu, Taipei (TW)

(73) Assignee: KWANG YANG MOTOR CO., LTD., Kaohsiung (TW)

( * ) Notice: Subject to any disclaimer, the term of this patent is extended or adjusted under 35 U.S.C. 154(b) by 0 days.

(21) Appl. No.: 16/286,335

(22) Filed: Feb. 26, 2019

(65) Prior Publication Data

US 2019/0273533 A1 Sep. 5, 2019

(30) Foreign Application Priority Data

Mar. 2, 2018 (TW) .............................. 107106999 A

(51) Int. Cl.
*H04B 5/00* (2006.01)
*H04W 4/80* (2018.01)

(52) U.S. Cl.
CPC ............ *H04B 5/0031* (2013.01); *H04W 4/80* (2018.02)

(58) Field of Classification Search
CPC ............................... H04B 5/0031; H04W 4/80
See application file for complete search history.

(56) References Cited

U.S. PATENT DOCUMENTS

| | | | | |
|---|---|---|---|---|
| 2008/0157722 A1* | 7/2008 | Nobutaka | ............. | H01M 10/44 320/137 |
| 2008/0281732 A1* | 11/2008 | Yamada | ................. | G06Q 10/30 705/30 |
| 2012/0262111 A1* | 10/2012 | Soong | .................. | G07F 15/005 320/109 |
| 2013/0262002 A1* | 10/2013 | Braun | ...................... | H04Q 9/00 702/63 |
| 2015/0149015 A1* | 5/2015 | Nakano | ............... | B60L 11/1861 701/22 |
| 2016/0087314 A1* | 3/2016 | Arashima | ........... | H01M 10/425 320/134 |
| 2016/0267579 A1* | 9/2016 | Toya | .................. | G06Q 30/0645 |
| 2017/0103235 A1* | 4/2017 | Shimma | .................. | G06F 1/206 |
| 2017/0172415 A1* | 6/2017 | Wik | ........................ | H04W 4/80 |
| 2018/0253788 A1* | 9/2018 | Takatsuka | ............... | B60L 58/12 |

FOREIGN PATENT DOCUMENTS

WO 2016143375 A1 9/2016

OTHER PUBLICATIONS

Search Report issued to European counterpart application No. 19154052.5 by the EPO dated Jul. 3, 2019.

* cited by examiner

*Primary Examiner* — Wen W Huang
(74) *Attorney, Agent, or Firm* — Christensen O'Connor Johnson Kindness PLLC

(57) ABSTRACT

A system for managing power supply devices includes an electronic device and plural power supply devices including a first power supply device and a second power supply device. The electronic device is configured to enable the first power supply device to delete a part of battery information stored therein, and enable the second power supply device to store therein a portion of the battery information that was originally stored in the power supply device.

6 Claims, 5 Drawing Sheets

METHOD AND ELECTRONIC DEVICE FOR MANAGING POWER SUPPLY DEVICES

CROSS-REFERENCE TO RELATED APPLICATION

This application claims priority of Taiwanese Invention Patent Application No. 107106999, filed on Mar. 2, 2018.

FIELD

The disclosure relates to management of power supply devices, and more particularly to information transfer between power supply devices.

BACKGROUND

With people's growing environmental awareness, electric vehicles (EVs) have been developed and are gaining public attention.

Conventional electric vehicles use rechargeable batteries. Once a rechargeable battery is exhausted or damaged, a replacement must be made at fixed charging stations Due to significant cost in both time and money for establishing a charging station, the number of available charging stations s often not proportional to the number of running electric vehicles. In this situation, for many EV users, it takes a long time to get to a charging station, and the user may have to wait in line for battery replacement. Such inconvenience may suppress people's willingness to purchase electric vehicles, and is thus unfavorable to the EV industry.

SUMMARY

Therefore, the present disclosure aims at providing a solution that is contributive to the provision of battery replacement/exchange facilities that can be quickly deployed at a low cost.

An object of the disclosure is to provide a method, and an electronic device for managing power supply devices that can alleviate at least one of the drawbacks of the prior art.

According to the disclosure, the method is to be implemented by an electronic device communicating with a first power supply device and a second power supply device. The method includes steps of: sending, to the first power supply device, an information request to request for battery information stored in the first, power supply device; receiving the battery information, from the first power supply device; sending, to the first power supply device, a disassociation instruction for deleting a part of the battery information stored in the first power supply device; and sending, to the second power supply device, a portion of the battery information received from the first power supply device for storage in the second power supply device.

According to the disclosure, the electronic device is capable of communicating with a plurality of power supply devices including a first power supply device and a second power supply device for managing the plurality of power supply devices. The electronic device includes a communication module for communication with the plurality of power supply devices, and a processing module electrically connected to the communication module. The processing module is configured to send, to the first power supply device through the communication module, an information request to request for battery information stored in the first power supply device. The processing module is configured to receive the battery information from the first power supply, device through the communication module. The processing module is configured to send, to the first power supply device through the communication module, a disassociation instruction for deleting a part of the battery information stored in the first power supply device. The processing module is also configured to send, to the second power supply device through the communication module, a portion of the battery information received from the first power supply device for storage in the second power supply device.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
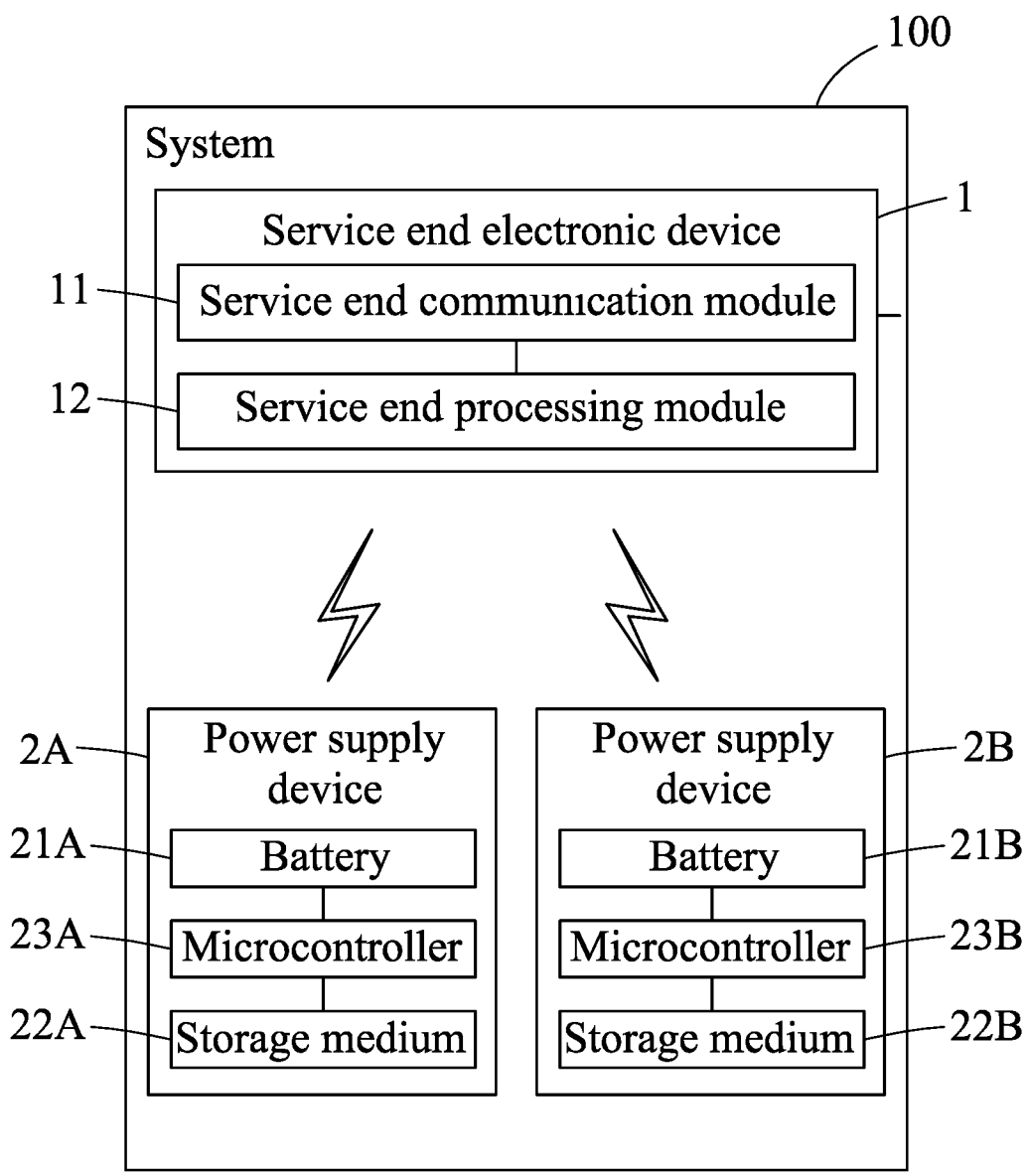
FIG. 1 is a block diagram which exemplarily illustrates a system for managing power supply devices according to an embodiment.

Before the disclosure is described in greater detail, it should, be noted that where considered appropriate, reference numerals or terminal portions of reference numerals have been repeated among the figures to indicate corresponding or analogous elements, which may optionally have similar characteristics.

FIG. 1 is a block diagram which exemplarily illustrates a system 100 for managing power supply devices according to an embodiment. Referring to FIG. 1, the system 100 includes a service end electronic device 1 (may be shortened to electronic device in parts of this disclosure) and plural power supply devices including power supply devices 2A and 2B that may communicate with the service end electronic device 1 via, for example, near-field communication (NFC). Each of the power supply devices has a unique battery identifier.

According to an embodiment, the service end electronic device 1 includes a service end communication module 11 and a service end processing module 12 electrically coupled to the service end communication module 11 (the service end communication module 11 and the service end processing module 12 may be shortened to communication module and processing module respectively in parts of this disclosure), In an embodiment, the service end electronic device 1 may be a mobile device of an EV vendor or a mobile device at a battery exchange service location affiliated with or authorized by the EV vendor. The service end electronic device 1 may be implemented as, for example, an NFC-enabled smart phone or an NFC-enabled tablet computer, but the disclosure is not limited thereto.

According to an embodiment, each of the power supply devices includes a battery, storage medium (e.g., a memory device) and a microcontroller electrically coupled to the battery and the storage medium. For example, the power supply device 2A includes a battery 21A, storage medium 22A and a microcontroller 23A, and the power supply device 2B includes a battery 21B, storage medium 22B and a microcontroller 23B. The storage medium and the microcontroller may be implemented as a Battery Management System (BMS), but the disclosure is not limited thereto.

According to an embodiment, each of the power supply devices stores battery information in its storage medium. According to an embodiment, when a power supply device is associated with at least one carrier device (e.g., an electronic vehicle) that has been allowed to use the power supply device, the battery information stored in the power supply device includes the battery identifier thereof and at least one carrier identifier of the at least one carrier device. On the other hand, when a power supply device is not associated with any carrier device, the battery information stored in the power supply device includes the battery identifier thereof and no carrier identifier. According to a further embodiment, when a power supply device is associated with at least one carrier device, its storage medium also stores a user identifier corresponding to a user of the power supply device that would otherwise not be stored in the storage medium when the power supply device is not associated with any carrier device.

Figure 2:
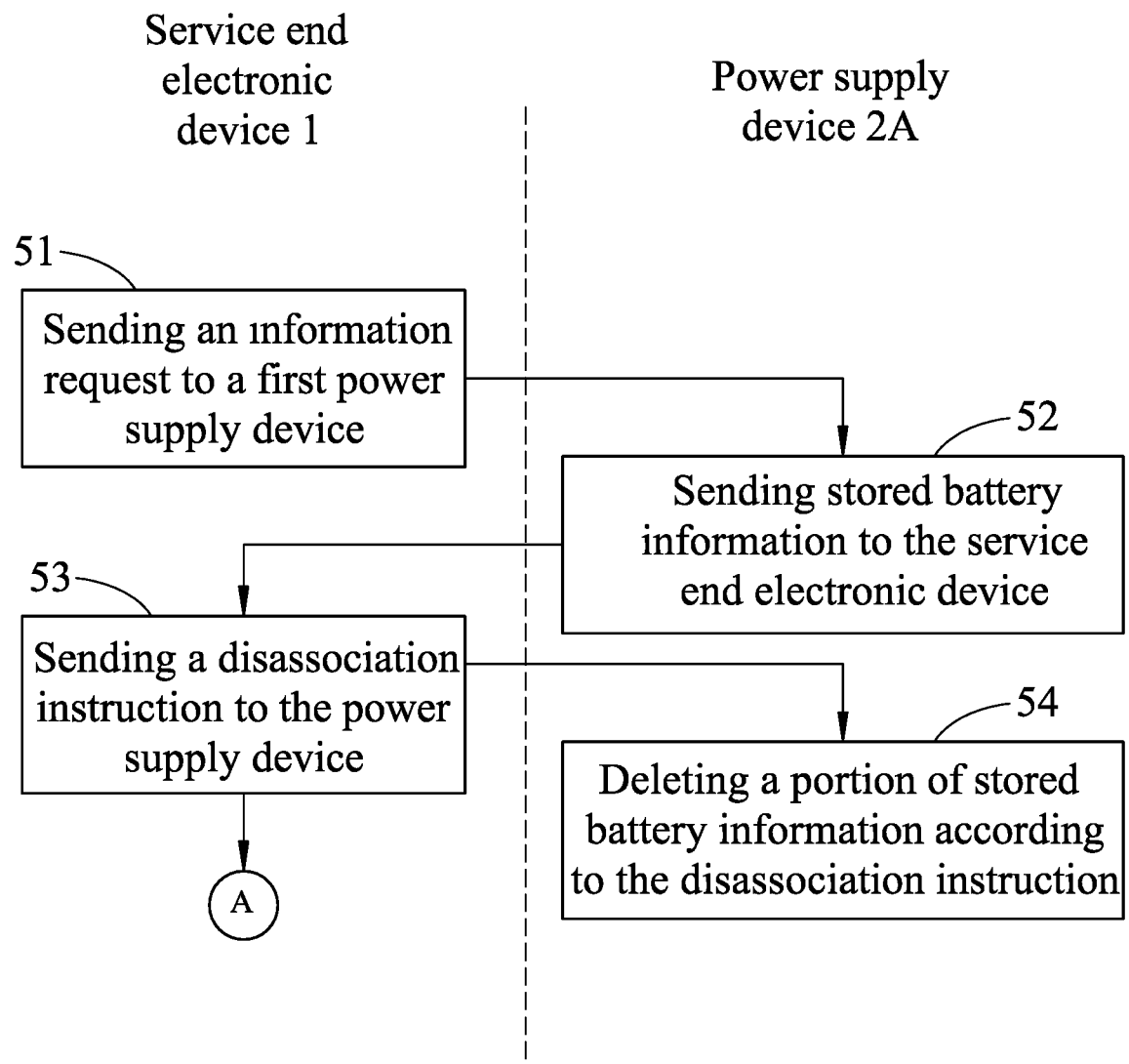
FIG. 2 is a flow chart which illustrates an example of a first part of a method for managing power supply devices according to an embodiment.
Figure 3:
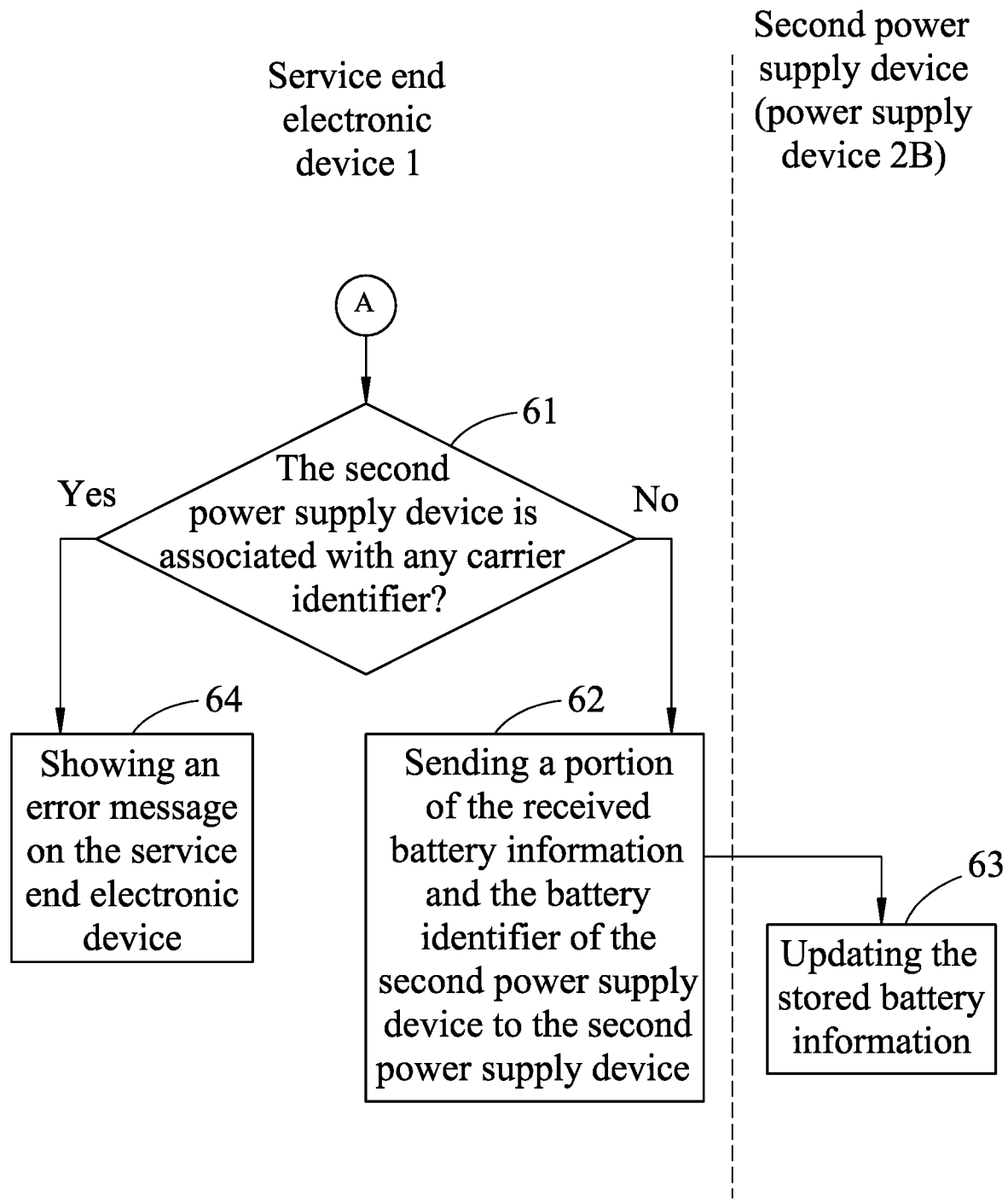
FIG. 3 is a flow chart which illustrates a first example of a second part of the method for managing power supply devices according to an embodiment.
Figure 5:
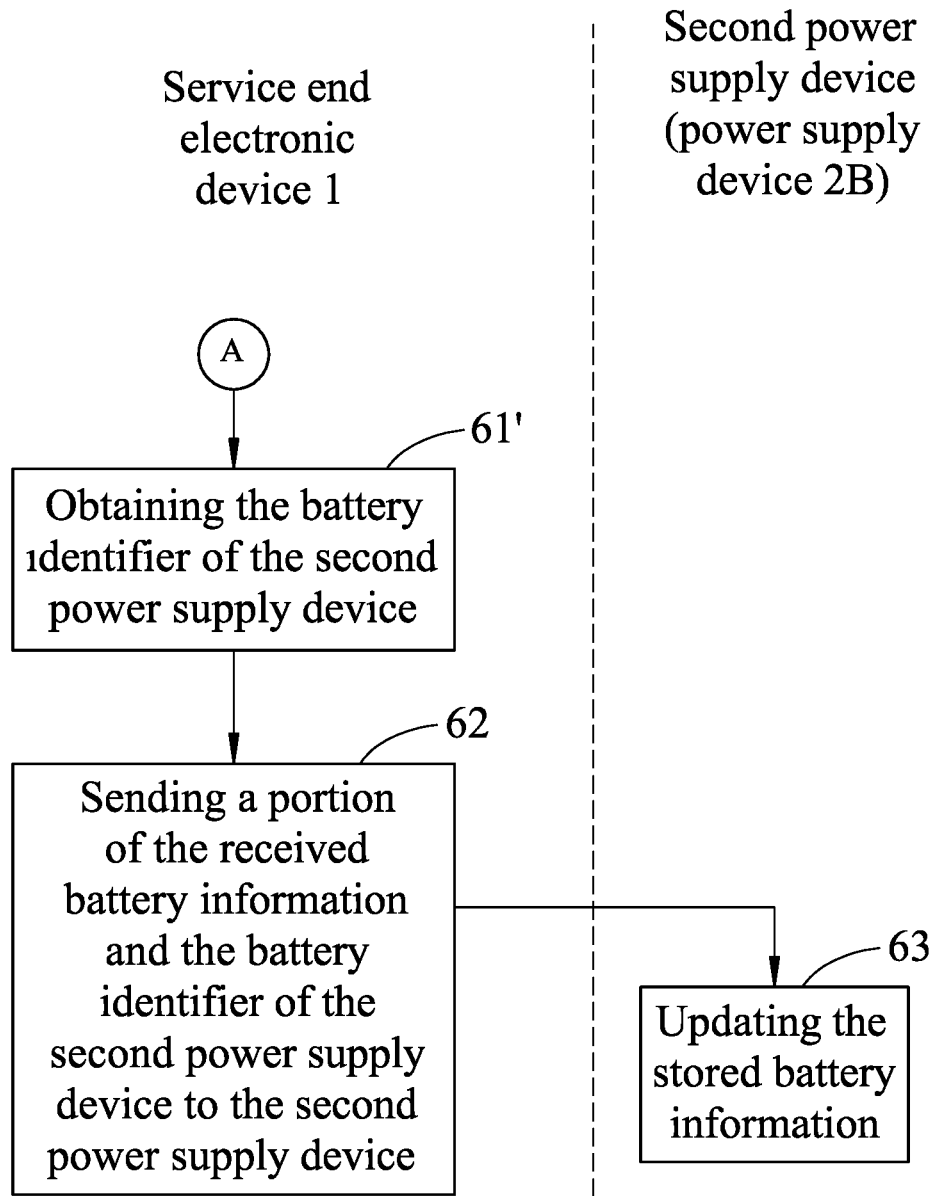
FIG. 5 is a flow chart which illustrates a second example of the second part of the method for managing power supply devices according to an embodiment.

A method for managing power supply devices may be implemented by the system 100 illustrated in FIG. 1. FIG. 2 illustrates an example of a first part of the method according to an embodiment, and FIGS. 3 and 5 separately illustrate an example of a second part of the method according to an embodiment. In the following description, it is assumed that, at the beginning of this process, the power supply device 2A is associated with at least one carrier device and is to be replaced by the power supply device 2B which is supposed to not be associated with any carrier device. As will be described in more detail below, the first part of the method as illustrated in FIG. 2 emphasizes on deleting stored information from the power supply device to be replaced (here, the power supply device 2A), and the second part of the method as illustrated in FIGS. 3 and 5 emphasizes on writing information to the replacement power supply device (here, the power supply device 2B).

Referring to FIG. 2 which illustrates an example of the first part of the method for managing power supply devices, there are depicted steps 51-54.

In step 51, the service end processing module 12 generates an information request to request for the battery information stored in a first power supply device (here, the power supply device 2A), and the service end communication module 11 sends the information request to the power supply device 2A via, for example, near-field communication.

In step 52, the microcontroller 23A of the power supply device 2A receives the information request and sends the battery information stored in the storage medium 22A to the service end electronic device 1 via, for example, near-field communication.

In step 53, the service end processing module 12 receives the battery information from the power supply device 2A through the service end communication module 11 via, for example, near-field communication. Then, the service end processing module 12 generates a disassociation instruction, and the service end communication module 11 sends the disassociation instruction to the power supply device 2A via, for example, near-field communication.

In step 54, the microcontroller 23 of the power supply device 2A receives the disassociation instruction via, for example, near-field communication, and deletes a portion of the battery information stored in the storage medium 22A according to the received disassociation instruction. According to an embodiment, the deleted portion includes at least one carrier identifier originally stored in the storage medium 22A (the at least one carrier device that corresponds to the at least one carrier identifier being originally allowed to use the power supply device 2A), and does not include the battery identifier. According to a further embodiment, the deleted data also includes the user identifier.

Referring to FIG. 3 which illustrates a first example of the second part of the method for managing power supply devices, there are depicted steps 61-64.

In step 61, the service end processing module 12 determines whether a second power supply device (here, the power supply device 2B) is associated with any carrier identifier (i.e., associated with any carrier device). If so, the process proceeds to step 64. Otherwise, the process proceeds to step 62. The process of step 61 is detailed in FIG. 4, which exemplarily illustrates sub-steps 611-613 of step 61.

Figure 4:
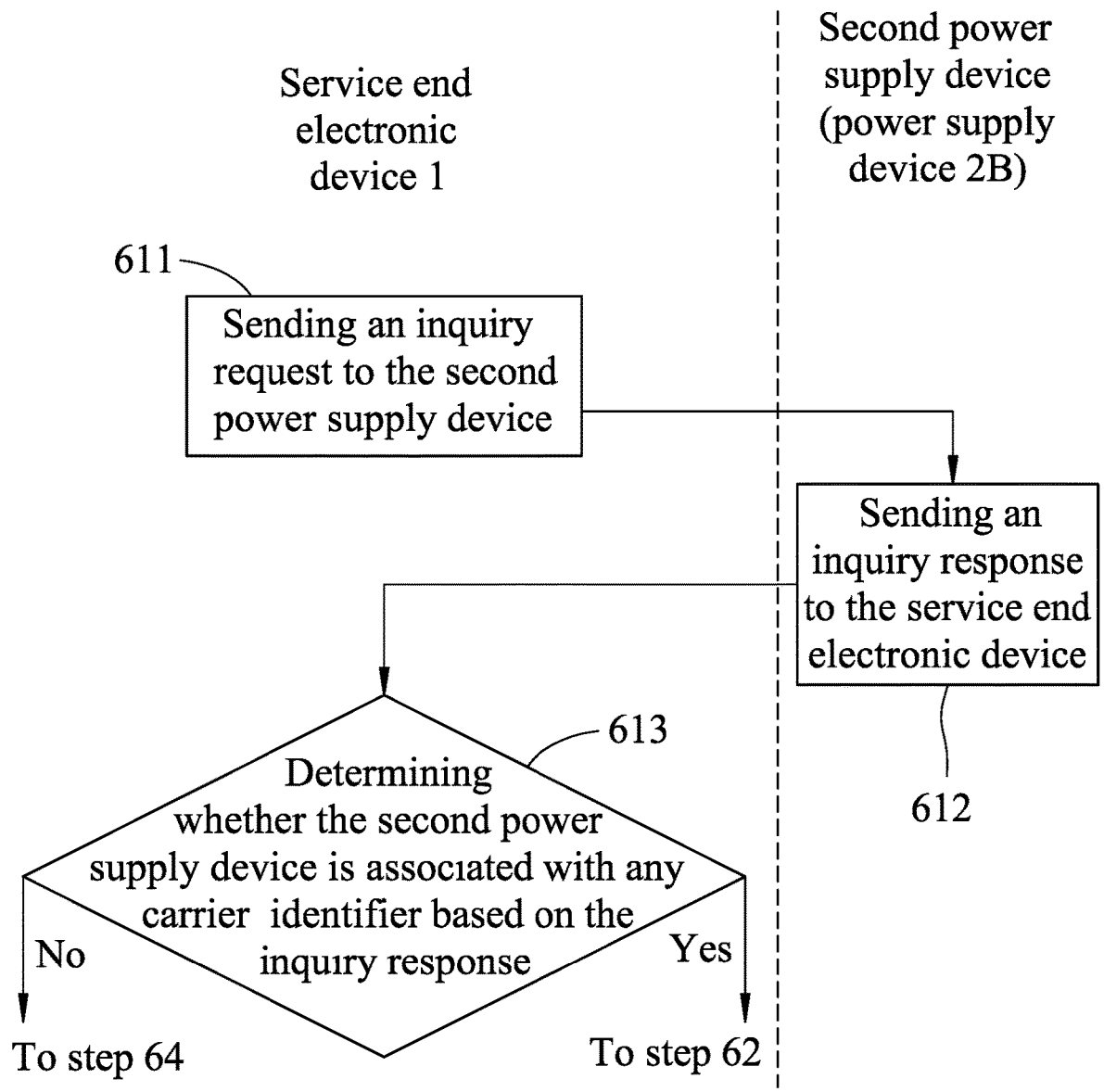
FIG. 4 is a flow chart which exemplarily illustrates a process for determining whether a power supply device is associated with any carrier identifier according to an embodiment.

Turing now to FIG. 4, in sub-step 611, the service end processing module 12 generates an inquiry request for inquiring whether there is any carrier identifier stored in the power supply device 2B, and the service end communication module 11 sends the inquiry request to the power supply device 2B via, for example, near-field communication.

In sub-step 612, the microcontroller 23B of the power supply device 2B receives the inquiry request and sends an inquiry response that is indicative of whether the power supply device 2B stores any carrier identifier to the service end electronic device 1 via, for example, near-field communication. In an embodiment, the inquiry response sent to the service end electronic device 1 contains the battery information stored in the storage medium 22B.

In sub-step 613, the service end processing module 12 receives, through the service end communication module 11, the inquiry response from the power supply device 2B via, for example, near-field communication, and makes a determination as to whether the power supply device 2B is associated with any carrier identifier based on the received inquiry response. For example, in the case that the received inquiry response contains the battery information stored in the power supply device 2B, the service end processing module 12 may determine whether the power supply device 2B is associated with any carrier identifier based on whether the received battery information includes a carrier identifier.

Turning now back to FIG. 3, in step 62, the service end processing module 12 sends, through the service end communication module 11, a portion of the battery information received in step 53 of FIG. 2 and the battery identifier of the power supply device 2B to the power supply device 2B via, for example, near-field communication. The battery identifier of the power supply device 2B may be obtained from, for example, the inquiry response received in sub-step 613. The battery identifier of the power supply device 2B may also be obtained by scanning a Quick Response Code (i.e., QR code) on the power supply device 2B. According to an embodiment, the portion of the battery information includes information of at least one carrier identifier, and does not include any battery identifier. According to a further embodiment, the portion of the battery information also includes information of the user identifier in an embodiment, the portion of the battery information corresponds to the deleted data of step 54.

In this case, the at least one carrier device that corresponds to the at least one carrier identifier of the deleted data was originally but is no longer allowed to use the power supply device 2A, and is, now, to be newly allowed to use the power supply device 2B.

In step 63, after the power supply device 2B receives the portion of the battery information and the battery identifier via, for example, near-field communication, the microcontroller 23B of the power supply device 2B updates the battery information stored in the storage medium 22B to incorporate the received portion of the battery information.

According to an embodiment, the portion of the battery information and the battery identifier of the power supply device 2B may first be combined into battery information corresponding to the power supply device 2B and then sent to the power supply device 2B in step 62. In this case, the microcontroller 23B may replace the battery information originally stored in the storage medium 22B with the received battery information in step 63.

In step 64, the service end processing module 12 shows an error message on a screen of the service end electronic device 1. According to an embodiment, the error message indicates that it is forbidden to write information into the power supply device 2B.

In an embodiment, the method may further include several optional steps subsequent to step 64. According to an embodiment, the method further includes two optional steps after step 64. In a first one of the two optional steps, the service end processing module 12 may generate a compulsory write instruction including the portion of the battery information received in step 53 of FIG. 2 and the battery identifier of the power supply device 2B, and the service end communication module 11 may send the compulsory write instruction to the power supply device 2B via, for example, near-field communication. In a second one of the two optional steps, the microcontroller 23B of the power supply device 2B stores, in response to receiving the compulsory write instruction, the portion of the battery information in the storage medium 22B.

A second example of the second part of the method for managing power supply devices is illustrated in FIG. 5. Referring to FIG. 5, the second example of the second part of the method includes steps 61', 62 and 63.

In step 61', the service end processing module 12 obtains the battery identifier of the power supply device 2B. The battery identifier of the power supply device 2B may be obtained by, for example, generating a battery identifier request, sending the battery identifier request to the power supply device 2B through the service end communication module 11, and receiving the battery identifier from the power supply device 2B through the service end communication module 11. The battery identifier of the power supply device 2B may also be obtained by scanning a QR code on the power supply device 2B.

Steps 62 and 63 following step 61' are similar to those in FIG. 3. Therefore, details of steps 62 and 63 are not repeated here. In short, in step 62, the service end processing module 12 sends a portion of the battery information received in step 53 of FIG. 2 and the battery identifier of the power supply device 2B obtained in step 61' to the power supply device 2B. In step 63, after the power supply device 2B receives the portion of the battery information and the battery identifier, the microcontroller 23B of the power supply device 2B updates the battery information stored in the storage medium 22B to incorporate the received portion of the battery information.

As can be seen, the major difference between the procedures illustrated in FIGS. 3 and 5 is that, the procedure of FIG. 5 omits the process of determining if the designated power supply device (i.e., the replacement power supply device) is associated with any carrier identifier or not and directly writes information into the designated power supply device.

To sum up, in the method for managing power supply devices as disclosed above, when a power supply device 2A is needed to be replaced by another power supply device 2B, a service end electronic device 1 (e.g., a mobile device of the vendor) first receives battery information stored in the power supply device 2A from the power supply device 2A. Then, the service end electronic device 1 instructs the power supply device 2A to delete a part of the battery information stored therein, and sends a portion of the received battery information (including, example, a carrier identifier that is allowed or going to use the power supply device 2B) to the power supply device 2B for storage therein. Adoption of such method in the procedure of battery replacement enables the procedure to be faster and easier. Further, battery replacement facilities that operate using such method cost less in both time and money.

In the description above, for the purposes of explanation, numerous specific details have been set forth in order to provide a thorough understanding of the embodiment (s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment (s), it is understood that this disclosure is not limited to the disclosed embodiment (s) but is intended to cover various arrangements included within the spirit and scope of the broadest interpretation so as to encompass all such modifications and equivalent arrangements.

What is claimed is:

1. A method for managing power supply devices that is to be implemented by an electronic device communicating with a first power supply device and a second power supply device, the method comprising steps of:
   sending, to the first power supply device, an information request to request for battery information stored in the first power supply device;
   receiving the battery information from the first power supply device;
   sending, to the first power supply device, a disassociation instruction for deleting a part of the battery information stored in the first power supply device;
   determining whether the second power supply device is associated with any carrier identifier of any carrier device that is allowed to use the second power supply device; and
   when it is determined that the second power supply device is not associated with any carrier identifier, sending, to the second power supply device, a portion of the battery information received from the first power supply device for storage in the second power supply device, wherein the step of determining whether the second power supply device is associated with any carrier identifier includes sub-steps of:
   sending an inquiry request to the second power supply device in order to inquire whether any carrier identifier is stored in the second power supply device;
   receiving, from the second power supply device, an inquiry response that indicates whether any carrier identifier is stored in the second power supply device; and
   determining whether the second power supply device is associated with any carrier identifier based on the inquiry response received from the second power supply device.

2. The method of claim 1, further comprising a step of obtaining, before the step of sending a portion of the battery information, a battery identifier uniquely corresponding to the second power supply device,
   wherein the step of sending a portion of the battery information includes sending, to the second power supply device, the portion of the battery information received from the first power supply device and the battery identifier corresponding to the second power supply device for storage in the second power supply device, the portion of the battery information including a carrier identifier corresponding to a carrier device that is newly allowed to use the second power supply device and not including a battery identifier uniquely corresponding to the first power supply device.

3. The method of claim 1, wherein the portion of the battery information to be sent to the second power supply device includes a user identifier corresponding to a user of the first power supply device as of the time the step of sending an information request is implemented.

4. An electronic device capable of communicating with a plurality of power supply devices including a first power supply device and a second power supply device for managing the plurality of power supply devices, the electronic device comprising:
   a communication module for communication with the plurality of power supply devices; and
   a processing module electrically connected to said communication module and configured to
      send, to the first power supply device through said communication module, an information request to request for battery information stored in the first power supply device;
      receive the battery information from the first power supply device through said communication module;
      send, to the first power supply device through said communication module, a disassociation instruction for deleting a part of the battery information stored in the first power supply device;
      send an inquiry request to the second power supply device through said communication module in order to inquire whether any carrier identifier is stored in the second power supply device;
      receive, from the second power supply device through said communication module, an inquiry response that indicates whether any carrier identifier is stored in the second power supply device;
      determine, based on the inquiry response received from the second power supply device, whether the second power supply device is associated with any carrier identifier of any carrier device that is allowed to use the second power supply device; and
      when it is determined that the second power supply device is not associated with any carrier identifier, send, to the second power supply device through said communication module, a portion of the battery information received from the first power supply device for storage in the second power supply device.

5. The electronic device of claim 4, wherein said processing module is further configured to:
   obtain a battery identifier uniquely corresponding to the second power supply device; and
   send, to the second power supply device through said communication module, the portion of the battery information received from the first power supply device and the battery identifier corresponding to the second power supply device for storage in the second power supply device, the portion of the battery information including a carrier identifier corresponding to a carrier device that is newly allowed to use the second power supply device and not including a battery identifier uniquely corresponding to the first power supply device.

6. The electronic device of claim 4, wherein the portion of the battery information to be sent to the second power supply device includes a user identifier corresponding to a user of the first power supply device as of the time the battery information is sent by the first power supply device.

* * * * *